US012617465B2

(12) United States Patent
Kumar et al.

(10) Patent No.: US 12,617,465 B2
(45) Date of Patent: May 5, 2026

(54) DYNAMICALLY ADJUSTING STEERING TORQUE OVERLAY OUTPUT

(71) Applicant: PlusAI, Inc., Santa Clara, CA (US)

(72) Inventors: Amit Kumar, Sunnyvale, CA (US); Siva Bhargav Ravella, San Jose, CA (US); Alimzhan Sultangazin, Milpitas, CA (US)

(73) Assignee: PlusAI, Inc., Santa Clara, CA (US)

( * ) Notice: Subject to any disclaimer, the term of this patent is extended or adjusted under 35 U.S.C. 154(b) by 268 days.

(21) Appl. No.: 18/139,795

(22) Filed: Apr. 26, 2023

(65) Prior Publication Data

US 2024/0359739 A1     Oct. 31, 2024

(51) Int. Cl.
B62D 15/02          (2006.01)
B62D 5/04           (2006.01)

(52) U.S. Cl.
CPC ......... B62D 15/025 (2013.01); B62D 5/0463 (2013.01)

(58) Field of Classification Search
CPC .. B62D 15/029; B62D 15/025; B62D 5/0463; B62D 6/007; B62D 6/04
See application file for complete search history.

(56) References Cited

U.S. PATENT DOCUMENTS

| | | | |
|---|---|---|---|
| 2019/0236387 A1* | 8/2019 | Firik ..................... | G06F 3/0416 |
| 2020/0180688 A1* | 6/2020 | Jhang ..................... | B62D 6/002 |
| 2020/0189591 A1* | 6/2020 | Mellinger, III ........ | B62D 6/003 |
| 2021/0291897 A1* | 9/2021 | Hansson ................. | B62D 6/04 |

* cited by examiner

*Primary Examiner* — Yuen Wong

(74) *Attorney, Agent, or Firm* — Kilpatrick Townsend & Stockton LLP

(57)          ABSTRACT

Embodiments provide a vehicle computer coupled to a vehicle. The vehicle computer may be configured to receive sensor data from a plurality of sensors of the autonomous vehicle, analyze the sensor data, predict a need for a steering torque overlay based on analyzing the sensor data, determine a steering torque overlay output based on at least the sensor data, provide the steering torque overlay output to a steering system of the vehicle, and control the steering system in view of the steering torque overlay output. The steering torque overlay output is provided to the steering system while the vehicle is transitioning from an autonomous mode or a manual mode to a hybrid mode where the steering system is controlled simultaneously by the vehicle computer and a driver when the steering torque overlay output is applied.

20 Claims, 4 Drawing Sheets

200

High-level information sensors

Low-level information sensors

Map Module 202

Camera 204

Lidar 206

Additional Sensors 208

IMU 210

Steering system sensors 212

Trajectory event detection algorithm 250

Event needs torque overlay change? S220     NO

YES

NO

Output     YES     Desired steering angle achieved? S224

Set current overlay torque S222

300

Receiving, by a vehicle computer of an autonomous vehicle, sensor data from a
plurality of sensors of the autonomous vehicle
302

Analyzing, by the vehicle computer, the sensor data
304

Predicting, by the vehicle computer, a need for a steering torque overlay based on
analyzing the sensor data
306

Determining, by the vehicle computer, a steering torque overlay output based on at least
the sensor data
308

Providing, by the vehicle computer, the steering torque overlay output to a steering
system of the vehicle
310

Controlling, by the vehicle computer, the steering system in view of the steering torque
overlay output
312

FIG. 3

DYNAMICALLY ADJUSTING STEERING TORQUE OVERLAY OUTPUT

BACKGROUND

Various vehicles employ computing means to aid automated vehicle operation. Recently, in the automotive industry, much of the focus is on making a vehicle operate in a safe manner.

In various road scenarios and environmental conditions, a driver of a vehicle may need to apply a higher torque on the steering wheel to achieve a desired steering angle. In some scenarios, physical capabilities of the driver may preclude them from supplying such torque. Exemplary scenarios may include a long-term pull compensation, which is difficult for the driver to supply due to fatigue, or an extreme steering scenario to avoid a vehicle cutting into the driver's lane, where the driver would be unable to quickly supply a large torque on the steering wheel. Failure to supply a sufficient torque to achieve a desired steering angle can lead to a loss of vehicle stability and even compromise its safety.

Conventional systems providing an overlay steering system to adjust steering torque are mainly focused on scenarios relying on the current status of the vehicle, which can be detected from only the information available to the steering system (e.g., current steering wheel angle and torque, and/or current vehicle speed). Such systems do not consider additional factors that may contribute to the need for steering torque overlay which may arise in the near future. As a result, the overlay torque provided by such systems is reactive, i.e., providing overlay torque only after the steering angle sufficiently diverges from the desired one.

Embodiments are directed to addressing these and other problems, individually and collectively.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, embodiments provide a vehicle computer coupled to a vehicle. The vehicle computer includes one or more processors and a memory storing instructions that, when executed by the one or more processors, cause the one or more processors to receive sensor data from a plurality of sensors of the autonomous vehicle, analyze the sensor data, predict a need for a steering torque overlay based on analyzing the sensor data, determine a steering torque overlay output based on at least the sensor data, provide the steering torque overlay output to a steering system of the vehicle, and control the steering system in view of the steering torque overlay output. The plurality of sensors may include a map module, a camera, an inertial measurement unit (IMU), one or more steering system sensors, a radar sensor, a light detection and ranging (lidar) sensor, computer vision, a Global Positioning System (GPS) sensor, among other sensors. The vehicle is controlled in an autonomous mode, a manual mode or a hybrid mode. The steering torque overlay output is provided to the steering system while the vehicle is transitioning from an autonomous mode or a manual mode to a hybrid mode where the steering system is controlled simultaneously by the vehicle computer and a driver when the steering torque overlay output is applied.

In one general aspect, a method may include receiving, by a vehicle computer of an autonomous vehicle, sensor data from a plurality of sensors of the autonomous vehicle; analyzing, by the vehicle computer, the sensor data; predicting, by the vehicle computer, a need for a steering torque overlay based on analyzing the sensor data; determining, by the vehicle computer, a steering torque overlay output based on at least the sensor data; providing, by the vehicle computer, the steering torque overlay output to a steering system of the vehicle; and controlling, by the vehicle computer, the steering system in view of the steering torque overlay output. The vehicle is controlled in an autonomous mode, a manual mode or a hybrid mode. The steering torque overlay output is provided to the steering system while the vehicle is transitioning from an autonomous mode or a manual mode to a hybrid mode where the steering system is controlled simultaneously by the vehicle computer and a driver when the steering torque overlay output is applied.

In one general aspect, a non-transitory computer-readable medium storing instructions that, when executed by one or more processors of a vehicle computer of a vehicle, cause the vehicle computer to receive sensor data from a plurality of sensors of the autonomous vehicle, analyze the sensor data, predict a need for a steering torque overlay based on analyzing the sensor data, determine a steering torque overlay output based on at least the sensor data, provide steering torque overlay output to a steering system of the vehicle, and control the steering system in view of the steering torque overlay output. The vehicle is controlled in an autonomous mode, a manual mode or a hybrid mode.

Other embodiments of this aspect include corresponding computer systems, apparatus, and computer programs recorded on one or more computer storage devices, each configured to perform the actions of the methods.

Further details regarding embodiments of can be found in the Detailed Description and the Figures.

BRIEF DESCRIPTION OF THE DRAWINGS

FIG. 3 is a flowchart of an example process, according to various embodiments.

DETAILED DESCRIPTION

Figure 1:
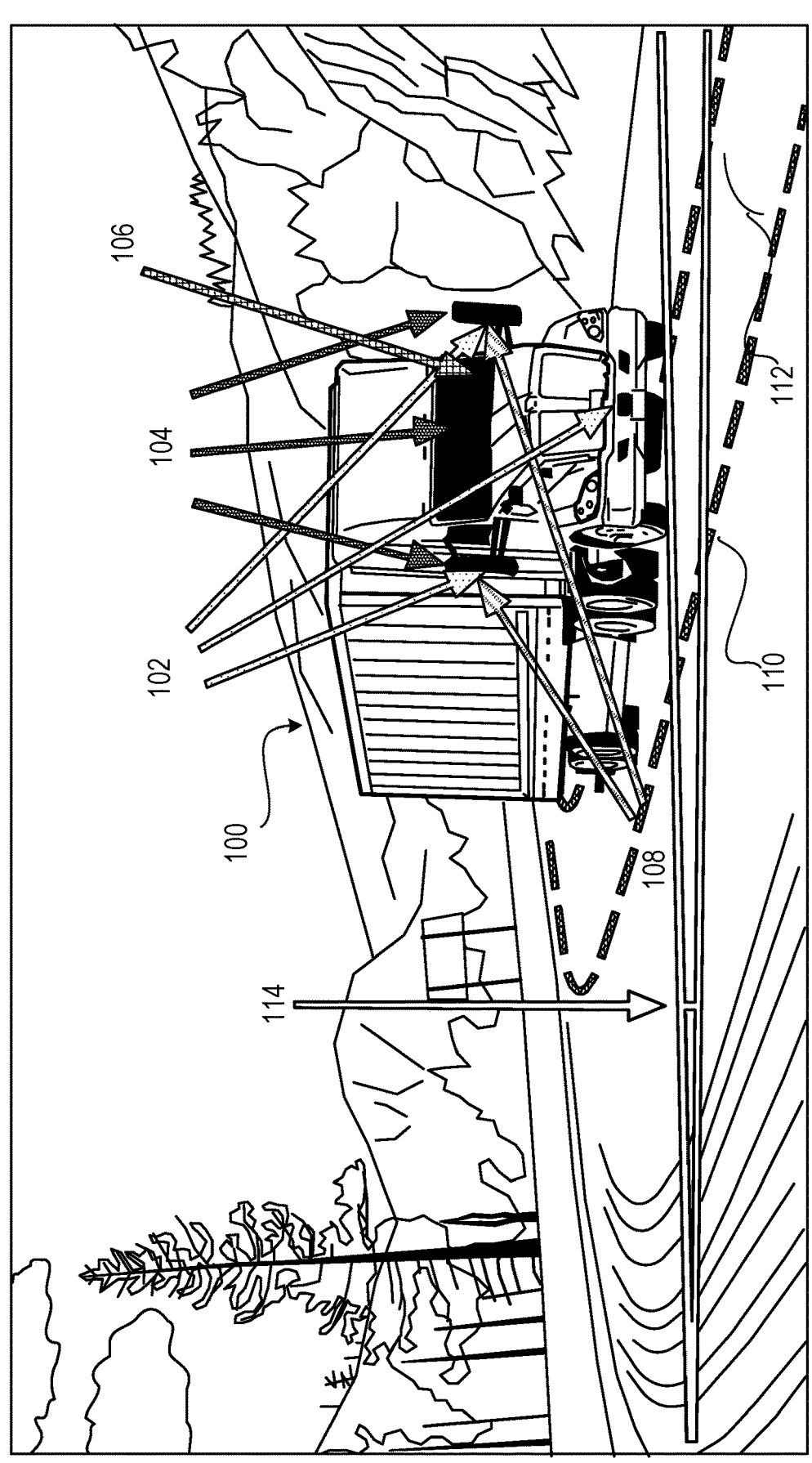
FIG. 1 illustrates an exemplary autonomous vehicle traveling on a road, according to various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments provide a vehicle computer coupled to a vehicle. The vehicle computer may be configured to dynamically adjust a steering torque output for an overlay steering system based on road scenarios and environmental conditions (e.g., together referred herein as "events" or "trajectory events"). Conventional systems that provide an overlay steering system to adjust steering torque are mainly focused on events which can be detected from only the information available to the steering system (e.g., current steering wheel angle and torque, and/or current vehicle speed, without considering more complex road scenarios (e.g., vehicle cut-in, vehicle cut-out, upcoming curve) that may be currently present or manifest along a trajectory ahead of the vehicle. Embodiments determine a steering torque overlay output in such complex scenarios by analyzing and correlating data from various sensors of an autonomous vehicle (AV). Embodiments use sensor data including information about the environment and the road conditions to predict a need for steering torque overlay ahead of time, and supply the required steering torque overlay output on in advance or exactly on time, and consistently track the steering angle as well as updated sensor data for continuously adjusting the steering torque overlay output.

Prior to discussing embodiments, some terms can be described in further detail.

As used herein, a "maneuver" may refer to a sequence of desired system state (position, pose, speed etc.) in future time. A control module of a vehicle computer may receive the maneuver and generate instantaneous commands or a vector of commands as a function of time.

The commands may include steering commands and acceleration/deceleration commands among others.

As used herein, a "trajectory" may refer to a sequence of sequence of desired system state (position, pose, speed etc.) in future time. A control module of a vehicle computer may receive the trajectory and generate instantaneous commands or a vector of commands as a function of time. The commands may include steering commands and acceleration/deceleration commands among others.

As used herein, a "vehicle" may include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode.

As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

A "vehicle computer" may include one or more processors and a memory. A "processor" may include any suitable data computation device or devices. A processor may comprise one or more microprocessors working together to accomplish a desired function. A "memory" may be any suitable device or devices that can store electronic data. A suitable memory may comprise a non-transitory computer readable medium that stores instructions that can be executed by at least one processor to implement a desired method. Examples of memories may comprise one or more memory chips, disk drives, etc. Such memories may operate using any suitable electrical, optical, and/or magnetic mode of operation.

Details of some embodiments will now be described in greater detail.

Embodiments provide a vehicle computer of an autonomous vehicle that is configured to predict, and output a steering torque overlay. The vehicle computer may receive sensor data from a plurality of sensors of the autonomous vehicle. The plurality of sensors may include a map module, a camera, an inertial measurement unit (IMU), one or more steering system sensors, a radar sensor, a light detection and ranging (lidar) sensor, computer vision, a Global Positioning System (GPS) sensor, among other sensors. According to various embodiments, the vehicle may be controlled in an autonomous mode, a manual mode or a hybrid mode. In the hybrid mode, the vehicle may be simultaneously controlled by the autonomous driving system and the human driver. For example, when the vehicle is transitioning between an autonomous mode and a manual mode, the vehicle may be in the hybrid mode for a period of time, when both the autonomous driving system and the human driver may be controlling the vehicle at the same time (e.g., the autonomous driving system may be assisting the human driver for optimized control of the vehicle). According to various embodiments, the vehicle computer may provide the steering torque overlay output to the steering system while the vehicle is in the hybrid mode.

Upon receiving the sensor data from the plurality of sensors, the vehicle computer may analyze the sensor data, and predict a need for a steering torque overlay based on analyzing the sensor data. For example, the analysis of the sensor data may result in the vehicle computer detecting, using an event detection algorithm, a specific road condition or an environmental event based on sensor data. The events include, for example, driving on a banked road (i.e., a road whose surface is at an angle with a horizontal line), a directional wind, a road bump or other surface irregularities, a road curve, an increase or decrease in the vehicle speed, another vehicle cutting into the lane of the ego vehicle, or a lead vehicle leaving the lane of the ego vehicle. Each of these events may require either an increase or a decrease in the steering torque.

For example, additional steering torque (e.g., steering torque overlay) may need to be needed to compensate for a road bank angle or a steady side wind. The steering torque may need to be increased to assist the driver during an upcoming curve or to help stabilize the vehicle when hitting a road bump. As the speed of the vehicle increases, the steering torque overlay needs to be progressively decreased to prevent sudden steering angle changes at high speeds. The steering torque overlay may need to be increased for lane cut-in events to allow the driver to perform an avoidance maneuver, and, similarly, the overlay torque may need to be decreased for lane cut-out events to encourage the driver to remain in the current lane and make sure that the lane change maneuver is safe for the other vehicle.

When such events are detected, and the need for steering torque overlay is predicted by the vehicle computer, the vehicle computer determines a steering torque overlay output based on at least the sensor data, and provides the steering torque overlay output to a steering system of the vehicle. The vehicle computer may then control the steering system in view of the steering torque overlay output, including in the hybrid driving mode by assisting the human driver in controlling of the vehicle. That is, the vehicle computer and the human driver may be simultaneously controlling the vehicle when the vehicle computer provides the steering torque overlay output to the steering system of the vehicle. In some embodiments, the steering torque overlay output is provided to the steering system of the vehicle while the autonomous vehicle is transitioning from the autonomous mode or the manual mode to the hybrid mode.

According to various embodiments, the vehicle computer may receive the steering angle feedback to ensure that the desired steering angle is achieved. The vehicle computer may stop providing the steering torque overlay output if it is determined that the desired steering angle is achieved. In some embodiments, the vehicle computer may receive updated sensor data, and adjust the steering torque overlay output based on the updated sensor data. According to various embodiments, the vehicle computer may continuously monitor the required steering torque overlay output and the achieved steering angle to adjust the steering torque overlay output accordingly.

FIG. 1 illustrates an exemplary autonomous vehicle traveling on a road, according to various embodiments. The exemplary vehicle 100 may be traveling in one of an autonomous mode, a manual mode or a hybrid mode. In the autonomous mode, the vehicle may be controlled by a vehicle computer of the vehicle 100 in any one of the taxonomy levels 0 through 5. In the manual mode, the vehicle may be controlled by a human driver. In the hybrid mode, the vehicle may be controlled simultaneously by the vehicle computer and the human driver.

According to various embodiments, the vehicle computer may receive inputs (e.g., sensor data) from one or more input devices. The input devices may include one or more of a radar sensor 102, a light detection and ranging (lidar) sensor 108, a camera 104, an inertial measurement unit (IMU), and additional sensors 106 such as steering system sensors, computer vision, a Global Positioning System (GPS) sensor, etc. The sensors can collect real-time data of the vehicle and the surrounding environment and continuously transmit the data to the vehicle computer. In some embodiments, the vehicle computer may execute one or more trained machine learning models. The machine learning models can use the sensor data as inputs and continuously output events detected or identified along the trajectory ahead of the vehicle.

In some embodiments, the sensor data may be provided to a perception module of the vehicle computer that may identify one or more objects in the input data. The input data and the identified objects may then be provided to a prediction module of the vehicle computer that may predict trajectories of the identified objects, so that a planner module of the vehicle computer may determine one or more trajectories for the vehicle that would avoid the stationary or moving objects based on the input data from the prediction module. The one or more trajectories planned by the panning module may be provided to a control module of the vehicle computer, which would then control one or more actuators of the vehicle to have the vehicle advance in accordance with at least one of the one or more trajectories.

In some embodiments, the input from the one or more sensors may enable the vehicle computer to detect one or more of a road bank angle 114, a road surface deformation 112, a road curvature 110 among other trajectory events (e.g., a directional wind or other weather condition, an increase or decrease in the vehicle speed, another vehicle cutting into the lane of the ego vehicle 100, a lead vehicle leaving the lane of the ego vehicle 100 or a position of a secondary vehicle in proximity of the ego vehicle 100). Once such a trajectory event is identified along the trajectory ahead of the vehicle, the vehicle computer may predict a need for a steering torque overlay based on analyzing the sensor data. The vehicle computer may then determine the steering torque overlay output based on the detected and/or predicted events along the trajectory. According to various embodiments, determining the steering torque overlay output comprises (1) determining a steering torque overlay amount; and (2) determining a time to apply the steering torque overlay amount on the steering system. That is, the vehicle computer determines when and how much steering torque overlay to apply on the steering system.

For example, according to a first use case, the vehicle computer may determine a road bank angle along the trajectory ahead of the vehicle. The vehicle computer may then predict that that the steering torque will need to be increased to compensate for the road bank angle. The vehicle computer may then determine a steering torque overlay output including a steering torque overlay amount and a time to apply the steering torque overlay amount on the steering system to compensate for the road bank angle. The vehicle computer may provide the steering torque overlay output to a steering system of the vehicle. In some embodiments, the vehicle may be on a hybrid mode where the vehicle is controlled simultaneously by the driver (e.g., a human driver) and the vehicle computer of the vehicle. The steering torque overlay output is provided to the steering system of the vehicle at the right time for the vehicle to drive along the trajectory, over the road bank angle, in a controlled manner, without losing speed and/or torque.

According to a second exemplary use case, the vehicle computer may determine a steady side wind along the trajectory ahead of the vehicle. The vehicle computer may then predict that that the steering torque will need to be increased to compensate for the steady side wind. The vehicle computer may then determine a steering torque overlay output including a steering torque overlay amount and a time to apply the steering torque overlay amount on the steering system to compensate for the steady side wind. The vehicle computer may provide the steering torque overlay output to a steering system of the vehicle. In some embodiments, the vehicle may be on a hybrid mode where the vehicle is controlled simultaneously by the driver (e.g., a human driver) and the vehicle computer of the vehicle. The steering torque overlay output is provided to the steering system of the vehicle at the right time for the vehicle to drive along the trajectory, subject to the steady side wind, in a controlled manner, without losing speed and/or torque.

According to a third exemplary use case, the vehicle computer may determine that the lead vehicle is moving away from lane where the ego vehicle is traveling. That is, the vehicle computer may detect a lane cut-out event along the trajectory ahead of the vehicle. The vehicle computer may then predict that that the steering torque will need to be decreased to compensate for the lane cut-out event and to encourage the driver to remain in the current lane as well as to ensure that the lane change maneuver is safe for the other vehicle. The vehicle computer may then determine a steering torque overlay output including a steering torque overlay amount and a time to apply the steering torque overlay amount on the steering system. The vehicle computer may provide the steering torque overlay output to a steering system of the vehicle. In some embodiments, the vehicle may be on a hybrid mode where the vehicle is controlled simultaneously by the driver (e.g., a human driver) and the vehicle computer of the vehicle. The steering torque overlay output is provided to the steering system of the vehicle at the right time for the vehicle to drive along the trajectory in a controlled manner.

Figure 2:
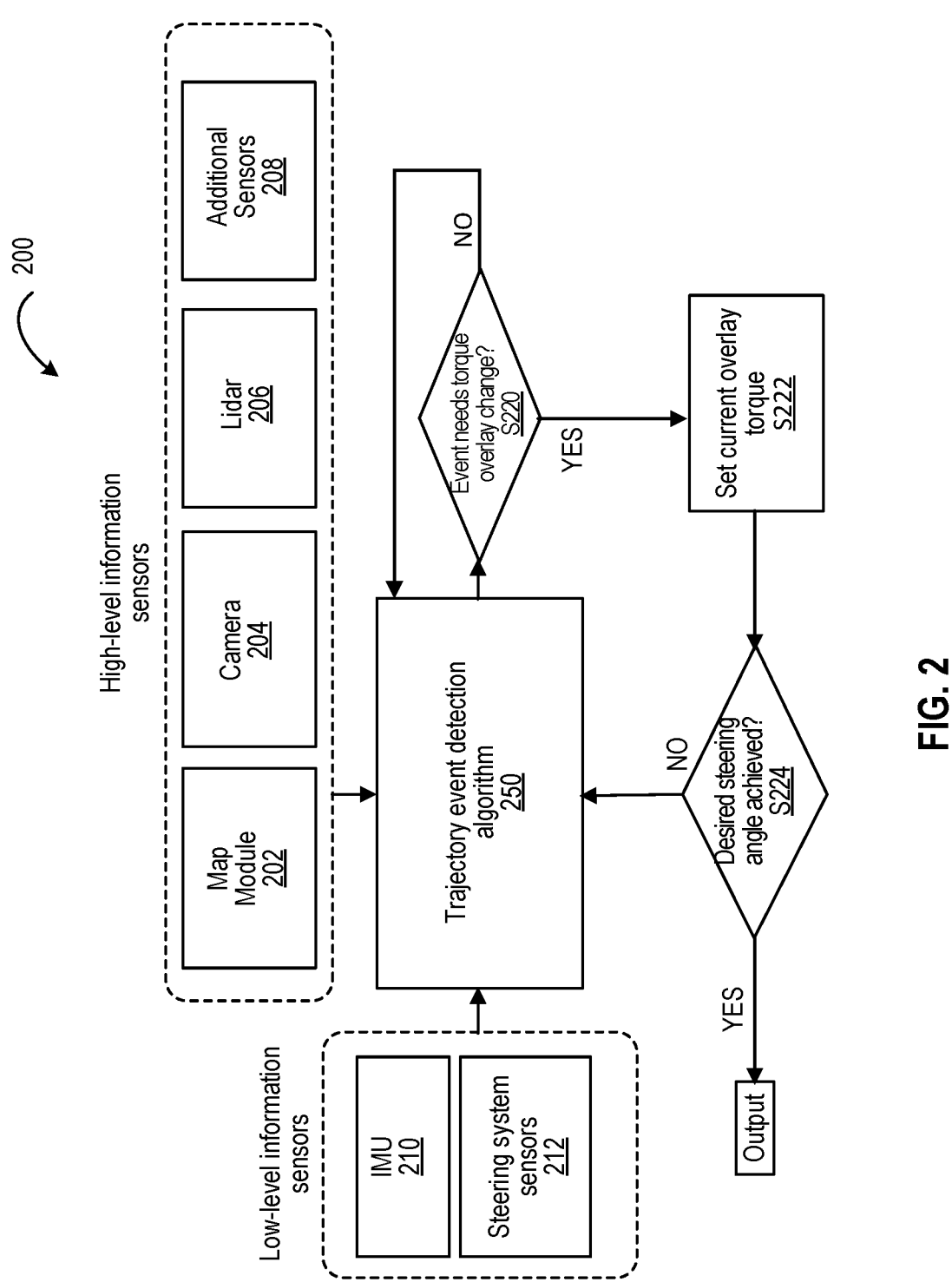
FIG. 2 illustrates an exemplary block diagram for predicting a need for a steering torque overlay and determining a steering torque overlay output, according to various embodiments.

FIG. 2 illustrates an exemplary block diagram for predicting a need for a steering torque overlay and determining a steering torque overlay output, according to various embodiments. The vehicle computer of the vehicle may execute an event detection algorithm 250. Sensor data from various sensors may be provided as input to the event detection algorithm 250. According to various embodiments, the input data may be grouped into data from a first set of sensors (e.g., high-level information sensors) and data from a second set of sensors (e.g., low-level information sensors). The first set of sensors may include one or more of a high definition (HD) map module (or a map source) 202 providing preliminary information about road type, road curvature, road bank, weather condition; a camera 204 providing information about traffic conditions (e.g., behavior of secondary vehicles in proximity of the ego vehicle 100) as well as up-to-date road information (e.g., road bumps, surface deformations); and a lidar 206 providing information about traffic conditions (e.g., behavior of secondary vehicles in proximity of the ego vehicle 100) as well as up-to-date road information (e.g., road bumps, surface deformations). The first set of sensors may include additional sensors 208 such as a barometric sensor for detecting the atmospheric pressure (which may be used by the trajectory event detection algorithm for determining a weather event relevant to the trajectory of the vehicle). The second set of sensors may include one or more of an IMU 210 providing information about current longitudinal and lateral speed profile; and one or more steering system sensors 212 providing information about the current steering wheel angle and steering wheel torque.

Upon receiving the information from the sensors, the event detection algorithm 250 may analyze the data and detect trajectory events including one or more of a bank angle of the road, a weather condition (e.g., steady side wind), a road surface deformation (e.g., a road bump), a road curve (e.g., a curvature angle of the road), an increase/decrease in the vehicle speed, another vehicle cutting into the ego vehicle's lane, lead vehicle leaving the ego vehicle's lane, among other events. For example, the event detection algorithm 250 may correlate the sensor data from various sensors prior to determining the one or more trajectory events. The event detection algorithm 250 may receive data from at least one of the first set of sensors (e.g., high-level information sensors). In some embodiments, the event detection algorithm 250 may receive data from only the first set of sensors (e.g., high-level information sensors). In other embodiments, the event detection algorithm 250 may receive data from the first set of sensors (e.g., high-level information sensors) and the second set of sensors (e.g., low-level information sensors).

In some embodiments, data from one or more sensors may be weighed heavily than data from remaining sensors. For example, sensor data from the first set of sensors (e.g., high-level information sensors) may be assigned a higher weight than data from the second set of sensors (e.g., low-level information sensors). The weights assigned to sensors and/or the sensor data may help the event detection algorithm 250 make a better-informed event detection and/or steering torque change prediction.

Once one or more trajectory events are detected, the vehicle computer may check whether the trajectory event will need a steering torque change, at step S220. That is, the vehicle computer may check whether the trajectory event will need a steering torque overlay.

If the vehicle computer predicts that no steering torque change is necessitated by the trajectory event (e.g., NO at step S220), the event detection algorithm 250 returns to analyzing updated (or new) sensor data. According to various embodiments, the event detection algorithm 250 continuously receives updated sensor data from the sensors, and checks whether any identified trajectory event will need a steering torque change (e.g., will need steering torque overlay).

If the vehicle computer predicts that the trajectory event needs a steering torque change (e.g., YES at step S220), the vehicle computer determines a torque overlay output including (1) a steering torque overlay amount; and (2) a time to apply the steering torque overlay amount on the steering system at step S222. That is, the vehicle computer determines when and how much steering torque overlay to apply on the steering system.

The vehicle computer provides the steering torque overlay output to a steering system of the vehicle a predetermined amount of time prior to a time when the steering torque overlay amount is needed. Accordingly, the steering torque overlay output can be applied timely to overcome the trajectory event detected or predicted along the trajectory of the vehicle. The vehicle computer may then control the steering system in view of the steering torque overlay output, including in the hybrid driving mode by assisting the human driver in controlling of the vehicle. That is, the vehicle computer and the human driver may be simultaneously controlling the vehicle when the vehicle computer provides the steering torque overlay output to the steering system of the vehicle. In some embodiments, the steering torque overlay output is provided to the steering system of the vehicle while the autonomous vehicle is transitioning from the autonomous mode or the manual mode to the hybrid mode.

According to various embodiments, upon determining the steering torque overlay output, the vehicle computer may check if the desired steering angle is achieved at step S224. If the desired steering angle is achieved (e.g., YES at S224), the vehicle computer may continue to monitor the sensor data, and stop providing the steering torque overlay output to the steering system of the vehicle. At this point, the vehicle may transition to a fully manual mode or fully autonomous mode. Alternatively, the vehicle may continue being controlled in the hybrid mode. If the desired steering angle is not achieved (e.g., NO at S224), the vehicle computer may continue calculating an updated steering torque overlay output using the updated (e.g., new) sensor data provided to the event detection algorithm 250.

FIG. 3 illustrates a flowchart 300 of steps for predicting and determining a steering torque overlay output for an autonomous vehicle, according to various embodiments.

At step 302, the vehicle computer of the autonomous vehicle receives sensor data from one or more sensors of the autonomous vehicle. The vehicle may be controlled in an autonomous mode, a manual mode or a hybrid mode. In the hybrid mode, the vehicle may be controlled simultaneously by a human driver and the vehicle computer. The plurality of sensors may include one or more of a camera, a motion sensor, an inertial measurement unit (IU), a light detection and ranging (LIDAR) sensor, or a high definition (HD) map source.

At step 304, the vehicle computer may analyze the sensor data. In some embodiments, analyzing the sensor data may include correlating the sensor data from a plurality of sensors. According to various embodiments, the vehicle computer may assign weights to the sensor data. For example, each sensor may be assigned a level or a score, and the weight assigned to the sensor data of that sensor may depend on the level or score of the sensor. For example, data from a high-level information sensor (e.g., map source, camera, lidar) may be assigned a higher weight than data from a low-level information sensor (e.g., IMU, steering wheel sensors). The vehicle computer may determine the steering torque overlay output based on weighted sensor data.

At step 306, the vehicle computer may predict a need for a steering torque overlay based on analyzing the sensor data. In some embodiments, the vehicle computer may predict a trajectory of the vehicle. For example, the sensor data may be provided to a perception module of the vehicle computer that may identify one or more objects in the input data. The input data and the identified objects may then be provided to a prediction module of the vehicle computer that may predict trajectories of the identified objects, so that a planner module of the vehicle computer may determine one or more trajectories for the vehicle that would avoid the stationary or moving objects based on the input data from the prediction module. The one or more trajectories planned by the panning module may be provided to a control module of the vehicle computer, which would then control one or more actuators of the vehicle to have the vehicle advance in accordance with at least one of the one or more trajectories. The vehicle computer may then predict one or more trajectory events along the trajectory ahead of a current position of the vehicle based on at least the sensor data. For example, the one or more trajectory events may include a curvature of a road, a surface deformation on the road, a bank angle of a road, a weather condition, or a position of a secondary vehicle in proximity of the autonomous vehicle.

At step 308, the vehicle computer may determine a steering torque overlay output based on at least the sensor data. The vehicle computer may then determine the steering torque overlay output to compensate for the determined or identified trajectory events along the trajectory. According to various embodiments, determining the steering torque overlay output may include determining a steering torque overlay amount, and determining a time to apply the steering torque overlay amount on the steering system.

At step 310, the vehicle computer may provide the steering torque overlay output to a steering system of the vehicle. According to various embodiments, the vehicle computer may continuously analyze the continuous stream of updated sensor data and adjust the steering torque overlay output based on the updated sensor data.

At step 312, the vehicle computer may control the steering system in view of the steering torque overlay output. As explained above, in some embodiments, the steering system of the vehicle is controlled simultaneously by the vehicle computer and a driver when the steering torque overlay output is applied. For example, the vehicle may be in an autonomous mode controlled by the vehicle computer. The vehicle computer may detect a trajectory event along the trajectory ahead of the vehicle, and determine that the driver should assume control or at least assist in controlling the vehicle. The vehicle computer may generate an alert for the driver to assume control of the vehicle, and provide the steering torque overlay output while the driver assumes control of the autonomous vehicle. In some embodiments, the steering torque overlay output is determined in part based on generating the alert. According to various embodiments, the steering torque overlay output may be provided to the steering system of the vehicle while the autonomous vehicle is transitioning from the autonomous mode or the manual mode to the hybrid mode.

Embodiments provide various technical improvements over conventional systems by predicting a need for a steering torque overlay based on input from a plurality of sensors. Embodiments are able to adjust the steering torque overlay in complex scenarios such as vehicles cutting into or out of the lane of the ego vehicle, or based on surface irregularities along the trajectory ahead of the ego vehicle. Conventional systems are unable to consider feedback from sensors such a map module, a camera, a lidar. In addition, conventional systems lack the intelligence to predict surface features along the trajectory ahead of the ego vehicle and increase the steering torque overlay accordingly.

Figure 4:
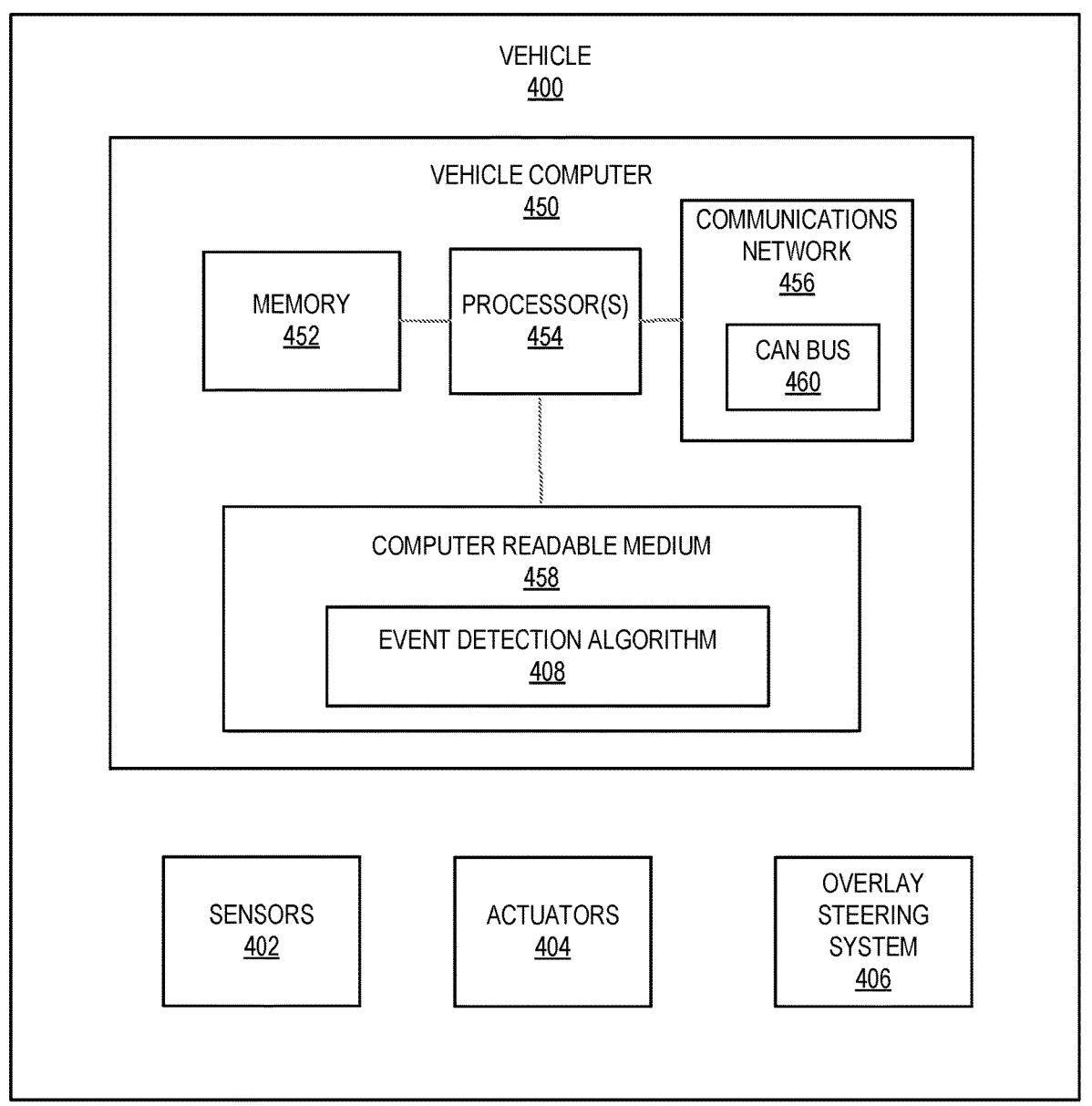
FIG. 4 illustrates a block diagram of an exemplary vehicle, according to various embodiments.

FIG. 4 illustrates a block diagram of an exemplary vehicle, according to various embodiments. The vehicle 400 may include a vehicle computer 450 that is configured to receive inputs from a plurality of sources including one or more sensors 402 coupled to the vehicle. The vehicle computer 450 is configured to generate outputs (e.g., control signals) for the one or more actuators 404 that control the vehicle 400. For example, the control signals, when executed by the actuators 404, may result in the vehicle computer 450 providing a steering torque overlay output to the actuators 404 associated with an overlay steering system 406 of the vehicle 400. The actuators 404 may control a steering, speed or throttle of the vehicle 400. The vehicle computer 450 and the overlay steering system 406 may be referred together as the overlay torque system.

According to various embodiments, the vehicle computer 450 may comprise processors 454, which may be coupled to a system memory 452 and a communications network 456.

The memory 452 may be in the form of one or more memory devices (e.g., RAM, EEPROM, ROM chips), using any suitable mode of data storage. The memory 452 may store one or more software algorithm(s) (not shown). The software algorithm(s) may include, for example, an artificial intelligence (AI) model(s) or algorithm(s), a machine learning (ML) model(s) or algorithm(s), an analytical model(s) or algorithm(s), a rule-based model(s) or algorithm(s), or a mathematical model(s) or algorithm(s).

The communications network 456 can be any suitable communications network(s) for transferring data among, to and from the components of the vehicle computer 450. In some instances, the communication network(s) may include one or more of a wired network such as, an Ethernet backbone network, a controller area network (CAN) bus 460, a local interconnect network (LIN), a media-oriented system transport (MOST), a fiber-optic network, a digital subscription line ("DSL") network, a broadband network, and/or a flexray network. In other instances, the communication network(s) may also include a wireless network such as, for example, a Wi-Fi or wireless local area network ("WLAN"), a wireless wide area network ("WWAN"), and/or a cellular network.

The sensors 402 may include one or more of a thermal imager camera, an infrared camera, a stereo camera, a time of flight camera, an red/green/blue (RGB) camera, a 2-D camera, a 3-D camera, a 360-degree camera, an imaging radar, a 3-D radar, a 4-D radar, a short-range radar, a medium-range radar, a long-range radar, a pulse-Doppler radar, a frequency-modulated continuous-wave (FMCW) radar, an amplitude modulated lidar, a frequency modulated lidar, a mechanical lidar, a microelectromechanical systems lidar, a flash lidar, an optical phase array lidar, a frequency-modulated continuous-wave (FMCW) lidar, a time of flight scanning lidar, an active sonar, a passive sonar, etc. One of ordinary skill in the art will appreciate that sensors 402 may include other types of sensors and the examples above are not meant to be exhaustive.

A computer readable medium 458 may also be operatively coupled to the processors 454 of the vehicle computer 450. The computer readable medium 458 may comprise an event detection algorithm 408 for identifying or detecting events along a trajectory ahead of the vehicle 400. The event detection algorithm 408 may receive sensor data as input from one or more sensors 402 coupled to the vehicle 400. The event detection algorithm 408 may analyze the sensor data, and determine/identify events along the trajectory of the vehicle that would require additional steering torque. The vehicle computer 450 may then generate a steering torque overlay output and provide the steering torque overlay output to the overlay steering system 406 of the vehicle 400. For example, the computer readable medium 458 may comprise code, executable by the processors 454, to perform a method including receiving sensor data from a plurality of sensors of the autonomous vehicle, wherein the vehicle is controlled in an autonomous mode, a manual mode or a hybrid mode; analyzing the sensor data; predicting a need for a steering torque overlay based on analyzing the sensor data; determining a steering torque overlay output based on at least the sensor data; providing the steering torque overlay output to a steering system of the vehicle; and controlling the steering system in view of the steering torque overlay output.

Although vehicle 400 (see FIG. 4) is described and illustrated as one particular configuration of vehicle, embodiments of the disclosure are suitable for use with a multiplicity of vehicles. In some instances, embodiments of the disclosure are particularly well suited for use with long haul or short haul vehicles, including but not limited to trucks, that carry a variety of cargo.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

With reference to the appended figures, components that can include memory (e.g., memory 952) can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, compact disc read-only memory (CD-ROM) or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer, controller, or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

What is claimed is:

1. A method comprising:
receiving, by a vehicle computer of a vehicle, sensor data from a plurality of sensors of the vehicle, wherein the vehicle is controlled in an autonomous mode, a manual mode, or a hybrid mode;
analyzing, by the vehicle computer, the sensor data;
predicting, by the vehicle computer, a need for a steering torque overlay based on analyzing the sensor data;
determining, by the vehicle computer, a steering torque overlay output based on the predicted need for the steering torque overlay;
determining, by the vehicle computer, a predetermined amount of time to apply the determined steering torque overlay output to a steering system of the vehicle based on the predicted need for the steering torque overlay;
providing, by the vehicle computer, the determined steering torque overlay output to the steering system of the vehicle;
controlling, by the vehicle computer, the steering system in view of the determined steering torque overlay output based on the predetermined amount of time; and
responsive to a desired steering angle not being achieved, adjusting, by the vehicle computer, the determined steering torque overlay output.

2. The method of claim 1, wherein the predicting further comprises:
predicting, by the vehicle computer, a trajectory of the vehicle;
predicting, by the vehicle computer, one or more trajectory events along the trajectory ahead of a current position of the vehicle based on at least the sensor data; and
determining, by the vehicle computer, the determined steering torque overlay output based on the one or more trajectory events along the trajectory.

3. The method of claim 2, wherein the one or more trajectory events along the trajectory includes one or more of a curvature of a road, a surface deformation on the road, a bank angle of the road, a weather condition, or a position of a secondary vehicle in proximity of the vehicle.

4. The method of claim 2, wherein determining the determined steering torque overlay output comprises:
determining a steering torque overlay amount to overcome the one or more trajectory events along the trajectory, the steering torque overlay amount to be applied on the steering system based on the predetermined amount of time.

5. The method of claim 1, wherein the analyzing the sensor data further comprises:
correlating the sensor data from the plurality of sensors including one or more of a camera, a motion sensor, an inertial measurement unit (IMU), a light detection and ranging (LIDAR) sensor, or a high definition (HD) map source.

6. The method of claim 5, further comprising:
assigning weights to the sensor data, wherein for each sensor of the plurality of sensors a weight is assigned to the sensor data received from the sensor and the weight being based on a score assigned to the sensor; and
determining the determined steering torque overlay output based on the weighted sensor data.

7. The method of claim 1, further comprising:
receiving updated sensor data; and
adjusting the determined steering torque overlay output based on the updated sensor data.

8. The method of claim 1, wherein the determined steering torque overlay output is provided to the steering system of the vehicle while the vehicle is transitioning from the autonomous mode or the manual mode to the hybrid mode.

9. The method of claim 1, further comprising:
generating, by the vehicle computer, an alert for a driver of the vehicle in the autonomous mode to assume control of the vehicle; and
providing, by the vehicle computer, the determined steering torque overlay output while the driver assumes control of the vehicle.

10. The method of claim 9, wherein the determined steering torque overlay output is determined in part based on generating the alert.

11. The method of claim 1, wherein the steering system of the vehicle is controlled simultaneously by the vehicle computer and a driver when the determined steering torque overlay output is applied.

12. A vehicle computer of a vehicle, the vehicle computer comprising:
one or more processors; and
a memory storing instructions that, when executed by the one or more processors, cause the one or more processors to:
receive sensor data from a plurality of sensors of the vehicle, wherein the vehicle is controlled in an autonomous mode, a manual mode, or a hybrid mode;
analyze the sensor data;
predict a need for a steering torque overlay based on analyzing the sensor data;
determine a steering torque overlay output based on the predicted need for the steering torque overlay;
determine a predetermined amount of time to apply the determined steering torque overlay output to a steering system of the vehicle based on the predicted need for the steering torque overlay;
provide the determined steering torque overlay output to the steering system of the vehicle;
control the steering system in view of the determined steering torque overlay output based on the predetermined amount of time; and
responsive to a desired steering angle not being achieved, adjust the determined steering torque overlay output.

13. The vehicle computer of claim 12, wherein the instructions, when executed by the one or more processors, further cause the one or more processors to:
predict a trajectory of the vehicle;
predict one or more trajectory events along the trajectory ahead of a current position of the vehicle based on at least the sensor data; and
determine the determined steering torque overlay output based on the one or more trajectory events along the trajectory.

14. The vehicle computer of claim 13, wherein the one or more trajectory events along the trajectory includes one or more of a curvature of a road, a surface deformation on the road, a bank angle of the road, a weather condition, or a position of a secondary vehicle in proximity of the vehicle.

15. The vehicle computer of claim 13, wherein the determining the determined steering torque overlay output comprises:
determining a steering torque overlay amount to overcome the one or more trajectory events along the trajectory, the determined steering torque overlay amount to be applied on the steering system based on the predetermined amount of time.

16. The vehicle computer of claim 12, wherein the analyzing the sensor data further comprises:
correlating the sensor data from the plurality of sensors including one or more of a camera, a motion sensor, an inertial measurement unit (IMU), a light detection and ranging (LIDAR) sensor, or a high definition (HD) map source.

17. The vehicle computer of claim 16, wherein the instructions, when executed by the one or more processors, further cause the one or more processors to:
assign weights to the sensor data, wherein for each sensor of the plurality of sensors a weight is assigned to the sensor data received from the sensor and the weight being based on a score assigned to the sensor; and
determine the determined steering torque overlay output based on the weighted sensor data.

18. The vehicle computer of claim 12, wherein the instructions, when executed by the one or more processors, further cause the one or more processors to:
receive updated sensor data; and
adjust the determined steering torque overlay output based on the updated sensor data.

19. The vehicle computer of claim 12, wherein the determined steering torque overlay output is provided to the steering system of the vehicle while the vehicle is transitioning from the autonomous mode or the manual mode to the hybrid mode such that the steering system of the vehicle is controlled simultaneously by the vehicle computer and a driver when the determined steering torque overlay output is applied.

20. A non-transitory computer-readable medium storing instructions that, when executed by one or more processors of a vehicle computer of a vehicle, cause the vehicle computer to perform operations comprising:
receive sensor data from a plurality of sensors of the vehicle, wherein the vehicle is controlled in an autonomous mode, a manual mode, or a hybrid mode;
analyze the sensor data;
predict a need for a steering torque overlay based on analyzing the sensor data;
determine a steering torque overlay output based on the predicted need for the steering torque overlay;
determine a predetermined amount of time to apply the determined steering torque overlay output to a steering system of the vehicle based on the sensor data predicted need for the steering torque overlay;
provide the determined steering torque overlay output to the steering system of the vehicle;
control the steering system in view of the determined steering torque overlay output based on the predetermined amount of time; and
responsive to a desired steering angle not being achieved, adjust the determined steering torque overlay output of a feature portion that determines at least a shape of the display content.

* * * * *